US008316351B2

(12) United States Patent
Nene et al.

(10) Patent No.: US 8,316,351 B2
(45) Date of Patent: Nov. 20, 2012

(54) UTILIZING A SCHEMA FOR DOCUMENTING MANAGED CODE

(75) Inventors: Tushar S. Nene, Redmond, WA (US); Charles Ainslie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1216 days.

(21) Appl. No.: 11/801,027

(22) Filed: May 7, 2007

(65) Prior Publication Data

US 2008/0281856 A1    Nov. 13, 2008

(51) Int. Cl.
    G06F 9/44    (2006.01)
(52) U.S. Cl. .................. 717/123; 715/239; 715/249
(58) Field of Classification Search .......... 717/120–123; 715/239, 249
    See application file for complete search history.

(56) References Cited

U.S. PATENT DOCUMENTS

| | | | | |
|---|---|---|---|---|
| 5,895,472 | A * | 4/1999 | Brodsky et al. .................. 1/1 |
| 5,953,526 | A | 9/1999 | Day et al. .................. 717/108 |
| 6,467,080 | B1 | 10/2002 | Devine et al. .................. 717/123 |
| 6,523,134 | B2 * | 2/2003 | Korenshtein .................. 714/16 |
| 6,698,013 | B1 * | 2/2004 | Bertero et al. .................. 717/127 |
| 7,114,149 | B2 | 9/2006 | Aptus et al. .................. 717/123 |
| 7,152,204 | B2 | 12/2006 | Upton .................. 715/239 |
| 7,430,732 | B2 * | 9/2008 | Cwalina et al. .................. 717/126 |
| 7,467,078 | B2 * | 12/2008 | Smith .................. 703/25 |
| 2003/0120671 | A1 * | 6/2003 | Kim et al. .................. 707/100 |
| 2004/0061719 | A1 | 4/2004 | Barsness et al. .................. 715/760 |
| 2004/0255270 | A1 * | 12/2004 | McGlinchey et al. .................. 717/109 |
| 2005/0060688 | A1 | 3/2005 | Kamalakantha .................. 717/123 |
| 2005/0076331 | A1 * | 4/2005 | Das et al. .................. 717/114 |
| 2005/0160408 | A1 | 7/2005 | Fleegal .................. 717/136 |
| 2005/0229099 | A1 * | 10/2005 | Rogerson et al. .................. 715/523 |
| 2005/0234984 | A1 * | 10/2005 | Rogerson et al. .................. 707/104.1 |
| 2006/0059459 | A1 | 3/2006 | Grimaldi .................. 717/109 |

OTHER PUBLICATIONS

Chidlovskii, "Schema Extraction from XML Data: A Grammatical Inference Approach", 2001.*
Microsoft online help "MAML—Microsoft Assistance Markup Language" 2005.*
Connor et al., "Automating API Documentation", 2003.*
McAllister, "The developer-Documenter Relationship in Java Software Development", 1999.*
Eklund et al., "Restructuring Help Systems using Formal Concept Analysis", 2005.*
help-info-de, "MAML—Microsoft Assistance Markup Language", Apr. 12, 2005.*
"*Download DITA-OT*" accessed Mar. 13, 2007, at http://dita-ot.sourceforge.net/SourceForgeFiles/doc/download.html; 2 pgs.
Leslie, D., et al.; "*Using Javadoc and XML to Produce API Reference Documentation*"; Apache Software Foundation; SIGDOC '02, Oct. 20-23, 2002, Toronto, Ontario, CA; 6 pgs.

* cited by examiner

*Primary Examiner* — Phillip H Nguyen
(74) *Attorney, Agent, or Firm* — Merchant & Gould

(57) ABSTRACT

A schema is provided that supports documenting API elements that is flexible and captures current technologies as well as evolves without interfering or breaking the definitions of the existing elements. The schema utilizes a flexible and extensible element that can be used to define various elements of the APIs and can be extended to define new technology when it is introduced.

20 Claims, 3 Drawing Sheets

UTILIZING A SCHEMA FOR DOCUMENTING MANAGED CODE

REFERENCE TO COMPUTER PROGRAM LISTING APPENDIX

The following compact disc submission includes two compact discs each having identical ASCII text files in the IBM-PC machine format and are compatible for reading with MS-DOS and MS-WINDOWS operating systems. The computer program listing files submitted on the compact discs are incorporated herein by reference in their entirety as if set forth in full in this document for all purposes: NAME SIZE (KB) CREATION DATE: _internal.txt 4 KB Apr. 23, 2007; base.txt 7 KB Apr. 23, 2007; baseConditional.txt 6 KB Apr. 23, 2007; block.txt 1 KB Apr. 23, 2007; blockCommon.txt 4 KB Apr. 23, 2007; blockSoftware.txt 2 KB Apr. 23, 2007; conditionSet.txt 5 KB Apr. 23, 2007; developer.txt 14 KB Apr. 23, 2007; developerCommand.txt 15 KB Apr. 23, 2007; developerManaged 27 KB Apr. 23, 2007; developerReference 13 KB Apr. 23, 2007; developerStructure 5 KB Apr.23, 2007; developerXaml.txt 7 KB Apr. 23, 2007; endUser.txt 3 KB Apr. 23, 2007; faq.txt 4 KB Apr. 23, 2007; glossary.txt 3 KB Apr. 23, 2007; hierarchy.txt 10 KB Apr. 23, 2007; inline.txt 8 KB Apr. 23, 2007; inlineCommon.txt 10 KB Apr. 23, 2007; inlineLinking.txt 9 KB Apr. 23, 2007; inlineSoftware.txt 8 KB Apr. 23, 2007; inlineUi.txt 7 KB Apr. 23, 2007; ITPro.txt 2 KB Apr. 23, 2007; Maml.txt 2 KB Apr. 23, 2007; shellExecute.txt 3 KB Apr. 23, 2007; space.txt 1 KB Apr. 23, 2007; standardCodes.txt 5 KB Apr. 23, 2007; structure.txt 6 KB Apr. 23, 2007; structureGlossary.txt 5 KB Apr. 23, 2007; structureList.txt 5 KB Apr. 23, 2007; structureMedia.txt 2 KB Apr. 23, 2007; structureProcedure.txt 2 KB Apr. 23, 2007; structureTable.txt 6 KB Apr. 23, 2007; structureTaskExecution.txt KB Apr. 23, 2007; task.txt 22 KB Apr. 23, 2007; troubleshooting.txt 4 KB Apr. 23, 2007; xlink.txt 12 KB Apr. 23, 2007; and further includes two compact discs each having identical ASCII text files in the IBM-PC machine format and are compatible for reading with MS-DOS and MS-WINDOWS operating systems entitled schema.txt. file size 14 KB, created on Sep. 20, 2012.

BACKGROUND

Documentation for managed Application Programming Interfaces (APIs) is used for helping developers programming against these APIs. The documentation typically resembles the API element structures very closely. During a software development process these APIs evolve and introduce new technologies and elements that need to be captured in the documentation. These code changes during the development process, however, make it difficult to complete the documentation that accompanies the code since the documentation relates closely to the code.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A schema is provided that supports documenting API elements, such as API elements in managed code. The schema captures current technologies as well as allowing the technologies to evolve without interfering or breaking the definitions of the existing elements. The schema utilizes a flexible and extensible element that can be used to define various elements of the APIs and can be extended to define the new technology when it is introduced.

DETAILED DESCRIPTION

Figure 1:
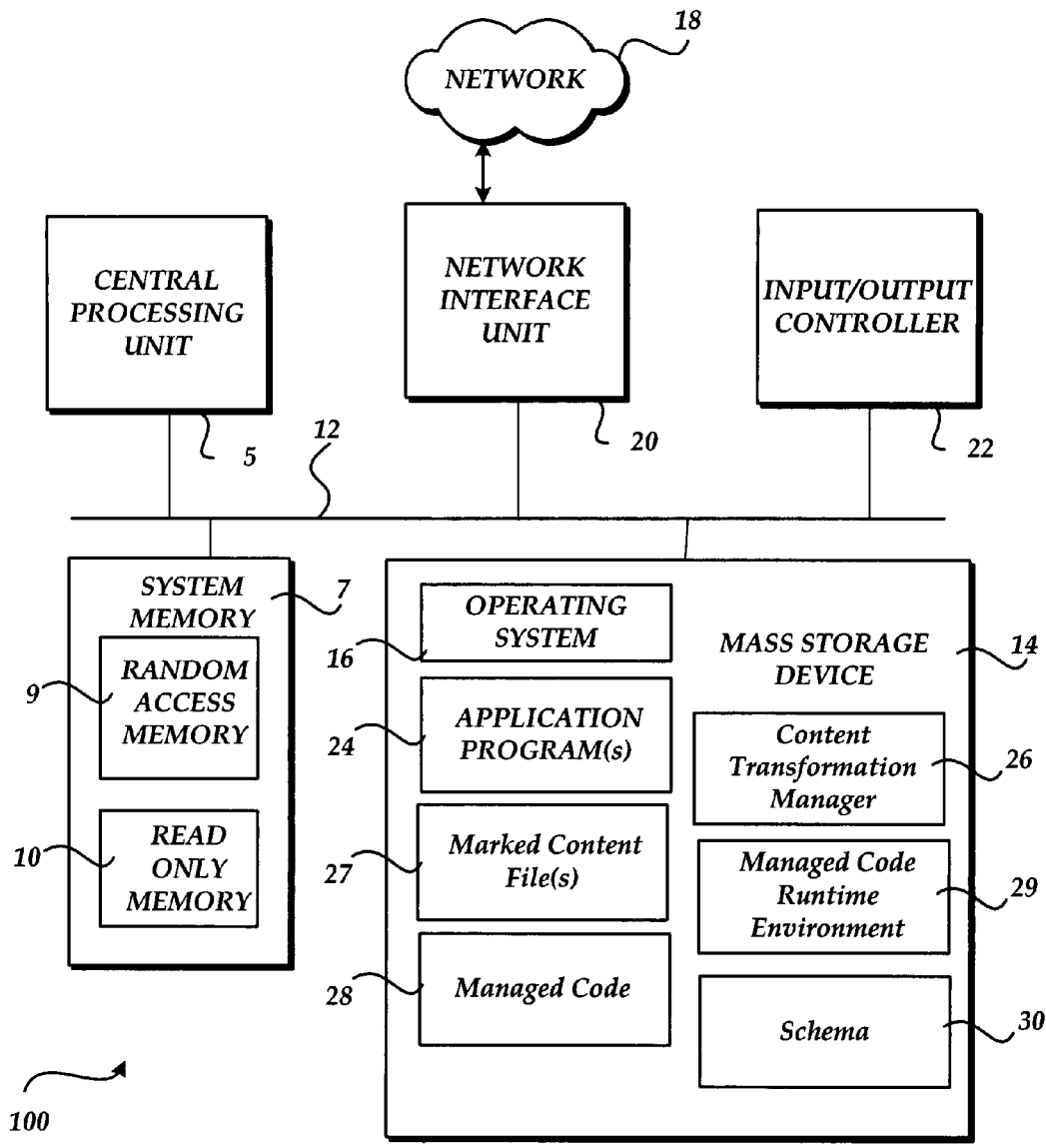
FIG. 1 illustrates an exemplary computing device.

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environiments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop or mobile computer and includes a central processing unit 5 ("CPU"), a system memory 7, including a random access memory 9 ("RAM") and a read-only memory ("ROM") 10, and a system bus 12 that couples the memory to the CPU 5.

A basic input/output system containing the basic routines that help to transfer information between elements within the computer, such as during startup, is stored in the ROM 10. The computer 100 further includes a mass storage device 14 for storing an operating system 16, marked content file(s) 27, managed code 28, application programs 24, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, or electronic stylus (not shown in FIG. 1). Similarly, an input/output controller 22 may provide output to a display screen 28, a printer, or other type of output device.

As mentioned briefly above, a number of program modules and data files may be stored in the mass storage device 14 and RAM 9 of the computer 100, including an operating system 16 suitable for controlling the operation of a networked personal computer, such as the WINDOWS VISTA operating system from MICROSOFT CORPORATION of Redmond, Washington. The mass storage device 14 and RAM 9 may also store one or more program modules. In particular, the mass storage device 14 and the RAM 9 may store one or more application programs 24.

Managed code runtime environment 29 is configured to manage the execution of managed code 29. For example, managed code runtime environment 29 may stop CPU 5 at any point during the execution of managed code 28 and retrieve information specific to the current CPU instruction address. This information includes items such as runtime state that includes register and/or stack memory contents. The managed code 28 takes the form of an intermediate language and associated metadata that describes all of the entry points and the constructs exposed (e.g., methods, properties) and their characteristics. For example, among others, the managed code may be programmed using a language such as: C#, J#, VB .Net, Jscript .Net, and C++. Before the managed code is executed, the intermediate language is compiled into native executable code by the managed code runtime environment 29. The managed code runtime environment 29 can perform many different tasks, including inserting traps and garbage collection hooks, exception handling, type safety, array bounds and index checking, and the like.

Marked content file(s) 27 include one or more content files which contain the content for the documentation for the managed code APIs, along with semantic indications for selected elements.

Schema 30 supports documenting API elements of managed code 28. The schema is directed at capturing current technologies as well as allowing the technologies to evolve without interfering or breaking the definitions of the existing elements. Schema 30 utilizes a flexible and extensible element that can be used to define various elements of the APIs and can be extended to define the new technology when it is introduced.

The content transformation manager 26 is operative to access the marked content file(s) 27 and transform the semantically-marked content to presentational content for display to the user.

Figure 2:
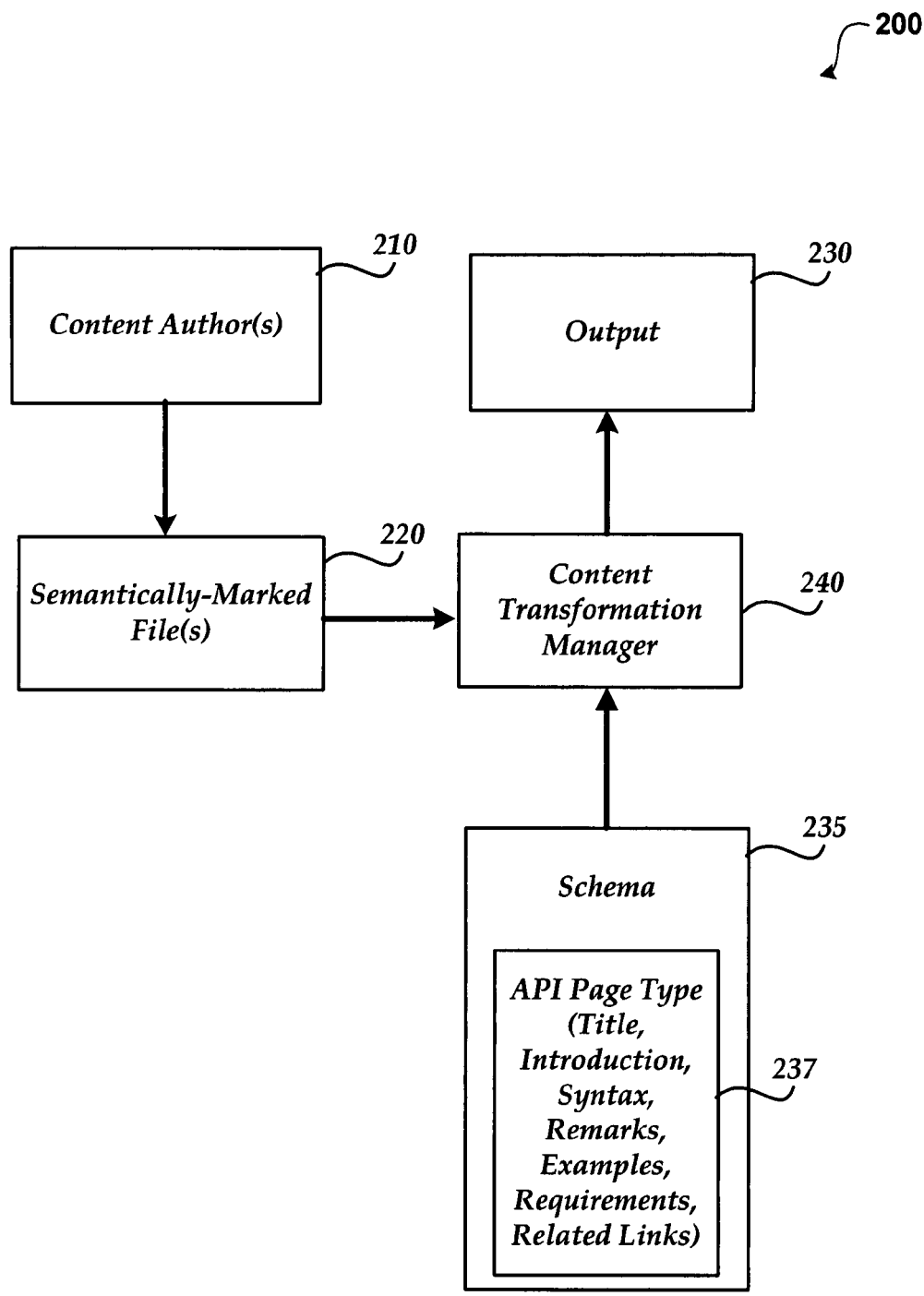
FIG. 2 shows a system for using a schema to document managed code.

FIG. 2 shows a system 200 for using a schema to document managed code. As illustrated, system 200 includes content author(s) 210, semantically-marked file(s) 220, and content transformation manager 240.

The documentation content is authored by one or more content authors 210. Instead of describing how the content should be displayed in purely presentation terms, the content author creates the content and describes the content in functional (semantic) terms. As such, the content authors 210 do not need to know how to code in a language which specifies how content should be presented. Rather, an author defines the document content semantically.

The documentation for managed assemblies uses semantically-marked file(s) 220 that helps identify the distinct elements within the document. As the documentation for managed code assemblies tend to evolve during the development life cycle, the schema 235 provides an extensible element that is used to define various elements of the APIs. The semantically-marked files 220 follow a Markup Language specification. According to one embodiment, the markup language is MICROSOFT's AML (Microsoft AML or MAML). Generally, the markup language is an XML-based markup language that is directed at providing documentation, such as online help which shifts the production of user assistance to the concept of structured authoring. The AML schema for documenting the managed APIs is flexible to allow for updates to the technology and resulting changes/extensions to the schema.

A schema 235 is utilized by the content author(s) to specify the documentation for the elements. In one embodiment, an extensible markup language (XML) schema is used to author the content. The schema 235 describes the purpose of certain items of the content. The schema can be used to specify a semantic description for all of the content, or for a specific word or a character of one word. The schema may be extended to incorporate any new elements.

The following includes portions of a schema that includes additions to an AML schema for including managed reference content. For instance, the schema may include authoring comments for types and members of an assembly; authoring shared content; integrate reflection information; render content file to client; and create content for not yet defined type and member definitions According to one embodiment, the schema defines an Application Programming Interface (API) page type 237. The API page type 237 is a generic page type that supports a particular page type by extension. This page type contains the elements for a page type. The generic API Page type may be used as it is presented or can be extended for specific usage scenarios (e.g. unmanaged ref content, XML schema documentation, web services documentation etc.).

According to one embodiment, the API page type 237 includes the following features. The features include a title, an introduction, a syntax, a remarks, Example, Requirements and Related Link.

The title of the element is normally authored by UE authors. According to one embodiment, the syntax is: title (acronym|conditionalInline|notLocalizable)*.

The introduction section is authored introduction of the type or member. This may contain inline links to types or members, company name, acronyms, tokens/phrases, and the like. The section may also contain links to external pages. The links to types or members are not explicitly authored and are resolved post comment authoring. According to one embodiment, the syntax is as follows: introduction? (para, alert, quote, parameterizedBlock, code, codeReference, computerOutput, list, alertSet, definitionTable, table, procedure, example, glossaryList)+.

The syntax supports any free flowing or structured data. This element may be extended for specific usage scenarios. Extensions related to syntax elements are covered below detailing managed reference specific extensions for the syntax element. This is an abstract element of type "any".

The remarks are authored and may contain references to inline text elements such as: type or method names, acronyms, glossary entries, external navigation links, and the like. According to one embodiment, the syntax is as follows: remarks? (para, alert, quote, parameterizedBlock, code, codeReference, computerOutput, list, alertSet, definitionTable, table, procedure, example, glossaryList)+.

The examples allow authors to provide one or more examples, tagged by language. The examples are partially authored and are partially referenced from the shared content. They may contain one or more examples for a given API type. The following is an exemplary syntax:

```
examples?
  example+
    title?
    introduction?
    codeExample+ @devLang
      title?
      introduction?
      (code | codeReference) (cdata)
      buildInstructions?
      robustProgramming?
      security? (different from security section)
      results? (cdata)
      remarks?
```

The requirements element defines the requirements of entity being described. The following is an exemplary syntax for the requirements element. requirements

```
products
  product+
development
  platform+
target
  platform+
assembly
standards
para+
frameworks
  framework+ @compatibility (supported, deprecated, obsolete)
    version
      (text)
    uri
```

The related links describes a collection of links, typically used for the "Related Topics" section of a document. The purpose of this element is to provide links to topics that may be of further interest to the user.

The following are examples usage for extension of API page type. Some examples of how the syntax element would be extended for specific managed ref types include:

```
<element name="classSyntax" type="managed:classSyntaxType"
  substitutionGroup="dev:syntax" />
<complexType name="classSyntaxType">
  <sequence>
    <element ref="dev:namespace" minOccurs="0" />
    <element ref="managed:assembly" minOccurs="0" />
    <element ref="managed:specifications" />
    <element ref="dev:implements" minOccurs="0" />
    <element ref="dev:members" />
    <element ref="managed:genericParameters" minOccurs="0" />
    <element ref="managed:genericConstraints" minOccurs="0" />
    <element ref="managed:derives" minOccurs="0" />
    <element ref="managed:attributes" minOccurs="0" />
    <element ref="managed:security" minOccurs="0" />
  </sequence>
</complexType>
```

Another example for showing how future changes can be incorporated without creating invalid AML files is also given below. For example, with .NET 3.0 attached properties are new to the Class definitions. Therefore, a new element called "attachedProperty" is created and the classSyntaxType is extended. This helps to ensure that the class syntax schema accommodates without invaliding the existing AML documents describing class types. <element name="attachedProperty" type="managed: attachedPropertyType"/>

The classSyntaxType is updated to refer to the attachedProperty element as follows:

```
<complexType name="classSyntaxType">
  <sequence>
    <element ref="dev:namespace" minOccurs="0" />
    ..
    <element ref="managed:attachedProperty" minOccurs="0" />
    ...
    <element ref="managed:security" minOccurs="0" />
  </sequence>
</complexType>
```

If there is a new type entity then supporting this new type entity is simply extending the syntax element (as shown in above example for class type) with the desired structure. This helps to ensure that the new type definition is supported without invalidating against AML schema. The new revised type definition can then be incorporated into next version of AML.

See ASCII text file entitled "schema.txt" on compact disc as referenced above entitled "Reference to Computer Program Listing Appendix."

Once the semantic authoring of the content has been completed, it is transformed and displayed to output 230 by content transform manager 240. Before the data is output, the content transform manager 240 may access a definition (not shown) that defines how the semantic elements are to be rendered. For example, the definition may include an extensible style sheet language transforms (XSLT).

Figure 3:
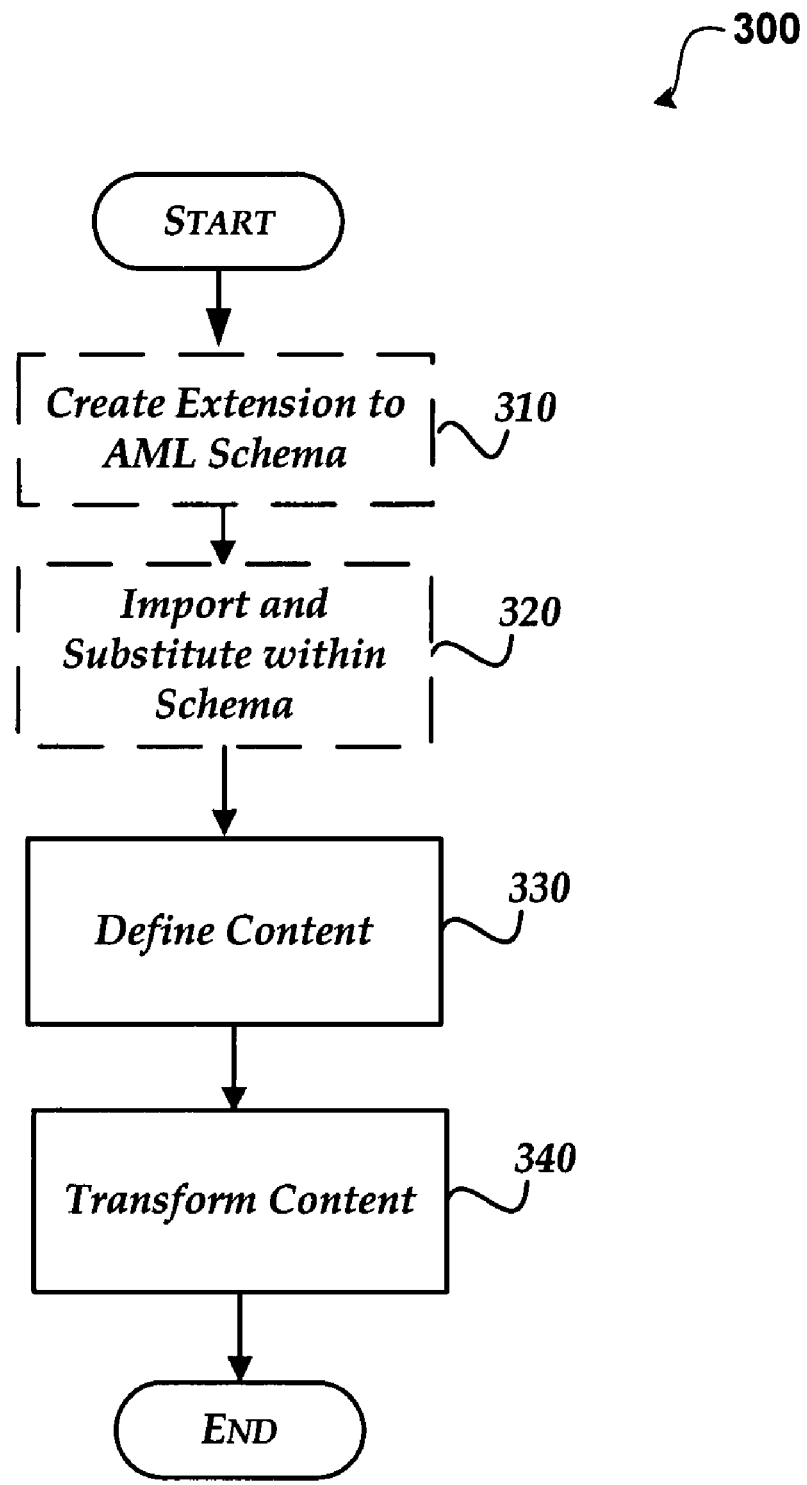
FIG. 3 shows an illustrative process for documenting managed code using a schema.

Referring now to FIG. 3, an illustrative process 300 for using a schema to document managed code will be described.

When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

After a start operation, the process flows to operation 310, where one or more new element structures may be defined for the schema. The new element structures may take any form. Since there may be any number of new type and member definitions that are introduced at a particular time and not yet made public, the baseline AML schema does not include definitions for these new types. The extensions allow the structure of the content to be defined such that the documentation is valid against the schema. This process may be repeated any number of times since the extensions may change multiple times before the structure is finalized.

Moving to operation 320, the new element structures are imported within the schema such that they may be used by the content author(s).

Flowing to operation 330, the content to be included within the documentation for the managed code APIs. The content may be included within a newly defined element, may be an extension to an element and/or it may be included within a predefined element or type, such as the API page type defined above.

Moving to operation 340, the content is transformed according to the defined definitions. Once the semantic authoring of the content has been completed in operation 330, it is transformed and may be displayed.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for documenting managed code, comprising:
   defining an element structure for each element of managed code to be documented that is incorporated in an Assistance Markup Language (AML) schema including defining element structures for each of: a class; a method; a constructor; and an Interface;
   defining semantically-marked content for documenting elements of managed code that are Application Programming Interface (API) elements, wherein the semantically-marked content follows the Assistance Markup Language (AML) schema;
   including definitions for the elements of the managed code to be documented within the AML schema;
   transforming the semantically-marked content to create presentational content for display according to a definition specifying the display of the content.

2. The method of claim 1, where the semantically-marked content is in an XML format.

3. The method of claim 1, wherein defining the element structure for each element of managed code to be documented that is incorporated in an Assistance Markup Language (AML) schema further comprises defining element structures for each of: a delegate; a property; an enumeration; an event; a namespace; a field; an overloads page; and a structure.

4. The method of claim 1, wherein the AML schema includes a page type that may be used for defining at least one of the elements of the managed code.

5. The method of claim 4, wherein the page type includes elements comprising: a title element; an introduction element; a syntax element; a remarks element; and a requirements element.

6. The method of claim 5, wherein the elements further comprise an examples element and a related links element.

7. The method of claim 5, wherein the syntax element is extended to support a new a managed reference type.

8. The method of claim 4, wherein the AML schema includes a default element type that is substituted in order to support at least one of the element types.

9. A computer-readable storage medium having computer-executable instructions for documenting managed code, comprising:
   defining an element structure for each element of managed code to be documented including defining element structures for each of: a class; a method; a constructor; and an Interface and incorporating each of the element structures into an Assistance Markup Language (AML) schema;
   obtaining semantically-marked content that provides documentation for documenting elements of managed code, wherein the semantically-marked content follows the Assistance Markup Language (AML) schema; and
   obtaining definitions for the elements of the managed code that follow the AML schema.

10. The computer-readable storage medium of claim 9, further comprising transforming the semantically-marked content to create presentational content.

11. The computer-readable storage medium of claim 9, further comprising creating an extension to the AML schema for at least one of the elements.

12. The computer-readable medium of claim 9, wherein at least one of the definitions is an extension to the AML schema.

13. The computer-readable storage medium of claim 9, wherein the AML schema includes a page type that may be used for defining at least one of the elements of the managed code.

14. The computer-readable storage medium of claim 13, wherein the page type includes elements comprising: a title element; an introduction element; a syntax element; a remarks element; and a requirements element.

15. The computer-readable storage medium of claim 14, wherein at least one of the elements within the page type is extended to support a new managed reference type.

16. The computer-readable storage medium of claim 9, wherein the AML schema includes a default element type that is substituted in order to support at least one of the element types.

17. A system for using an AML schema for documenting managed code, comprising:
   a processor and a computer-readable medium;
   an operating environment stored on the computer-readable medium and executing on the processor;
   a mass storage device that is configured to store semantically-marked content that documents elements of managed code, wherein the semantically-marked content follows an Assistance Markup Language (AML) schema that includes element structure for each element of managed code to be documented including defining element structures for each of: a class; a method; a constructor; and an Interface; and
   a content transformation manager operating under the control of the operating environment and operative to:
      accessing the semantically-marked content;
      obtaining definitions for the elements of the managed code from the AML schema; and
      transforming the semantically-marked content to create presentational content.

18. The system of claim 17, wherein at least one of the definitions is an extension to the AML schema.

19. The system of claim 17, wherein the AML schema includes a page type that may be used for defining at least one of the elements of the managed code; wherein the page type includes elements comprising: a title element; an introduction element; a syntax element; a remarks element; and a requirements element.

20. The system of claim 19, wherein at least one of the elements within the page type is extended to support a new a managed reference type.

* * * * *